United States Patent
Hillhouse

(10) Patent No.: US 8,171,304 B2
(45) Date of Patent: May 1, 2012

(54) METHOD, SYSTEM AND COMPUTER PROGRAM PRODUCT FOR MULTIPLE BIOMETRIC TEMPLATE SCREENING

(75) Inventor: Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 1579 days.

(21) Appl. No.: 10/438,067

(22) Filed: May 15, 2003

(65) Prior Publication Data

US 2004/0230810 A1 Nov. 18, 2004

(51) Int. Cl.
*H04L 9/32* (2006.01)
(52) U.S. Cl. ......... 713/186; 382/124; 382/125; 382/190
(58) Field of Classification Search .......... 382/124–127, 382/115, 116, 190, 226; 713/186
See application file for complete search history.

(56) References Cited

U.S. PATENT DOCUMENTS

| | | | | |
|---|---|---|---|---|
| 4,525,859 A | * | 6/1985 | Bowles et al. | 382/125 |
| 4,696,046 A | * | 9/1987 | Schiller | 382/125 |
| 4,790,564 A | * | 12/1988 | Larcher et al. | 283/69 |
| 4,947,443 A | * | 8/1990 | Costello | 382/125 |
| 5,040,224 A | * | 8/1991 | Hara | 382/124 |
| 5,067,162 A | * | 11/1991 | Driscoll et al. | 382/126 |
| 5,105,467 A | | 4/1992 | Kim et al. | 382/4 |
| 5,631,972 A | * | 5/1997 | Ferris et al. | 382/125 |
| 5,933,516 A | * | 8/1999 | Tu et al. | 382/125 |
| 5,960,101 A | * | 9/1999 | Lo et al. | 382/125 |
| 5,974,163 A | * | 10/1999 | Kamei | 382/125 |
| 5,978,495 A | * | 11/1999 | Thomopoulos et al. | 382/124 |

(Continued)

FOREIGN PATENT DOCUMENTS

| | | |
|---|---|---|
| EP | 0 786 735 A2 | 7/1997 |
| WO | WO 03/010705 A1 | 2/2003 |
| WO | WO 03010705 A1 * | 2/2003 |

OTHER PUBLICATIONS

Aner-Wolf, A. et al., "Video Mining," Kluwer Academic Press, Norwell, Rosenfeld, A. et al. (eds.), 2003, sections: 2.1.4, 2.2, pp. 38, 46.

(Continued)

*Primary Examiner* — Edward Zee
*Assistant Examiner* — Thomas Gyorfi
(74) *Attorney, Agent, or Firm* — Perkins Coie LLP

(57) ABSTRACT

A method, system and computer program product which allows identification of an enrollment biometric template having a highest probability of matching a sample biometric template from a plurality of enrolled biometric templates without compromising or significantly compromising system security. In one embodiment of the invention, first feature set information is derived from sample and enrollment biometric templates. The first feature set information generally comprises spatially dependent information associated with a fingerprint. The first feature set information is then used to determine which enrollment biometric template has the highest probability of matching the sample biometric template. Second feature set information is then derived from the biometric sample template and the determined enrollment biometric template and used to perform a one-to-one match. The second feature set information generally comprises pattern dependent information associated with a fingerprint.

14 Claims, 8 Drawing Sheets

U.S. PATENT DOCUMENTS

| | | | | |
|---|---|---|---|---|
| 6,134,340 A * | 10/2000 | Hsu et al. | | 382/124 |
| 6,226,391 B1 * | 5/2001 | Dydyk et al. | | 382/125 |
| 6,763,127 B1 * | 7/2004 | Lin et al. | | 382/125 |
| 6,778,685 B1 * | 8/2004 | Jiang et al. | | 382/124 |
| 6,778,687 B2 * | 8/2004 | Sanders et al. | | 382/125 |
| 6,876,757 B2 * | 4/2005 | Yau et al. | | 382/125 |
| 6,961,452 B2 * | 11/2005 | Fujii | | 382/125 |
| 7,035,444 B2 * | 4/2006 | Kunieda et al. | | 382/125 |
| 7,046,829 B2 * | 5/2006 | Udupa et al. | | 382/124 |
| 7,079,670 B2 * | 7/2006 | Pan et al. | | 382/124 |
| 7,142,699 B2 * | 11/2006 | Reisman et al. | | 382/124 |
| 7,260,246 B2 * | 8/2007 | Fujii | | 382/124 |
| 2002/0028004 A1 * | 3/2002 | Miura et al. | | 382/124 |
| 2003/0061233 A1 | 3/2003 | Manasse et al. | | 707/104.1 |

OTHER PUBLICATIONS

Jain, A., "Biometrics, Personal Identification in Networked Society," *Kluwer Academic Publishers Dordrecht*, 1999, p. 49 and 51.

Jain, L.C. et al., "Intelligent Biometric Techniques in Fingerprint and Face Recognition," CRC Press: Boca Raton, 1999, 23-24, bullets 1-5.

Prabhakar, R.V.S.N. et al., "A Parallel Algorithm for Finger Print Matching,". Proceedings of the Region Ten International Conference (TENCON), New York, *IEEE*, Nov. 22, 1989, 4, 373-376.

Ratha, N.K. et al., "A Real-time Matching System for Large Fingerprint Databases," *IEEE Transactions on Pattern Analaysis and Machine Intelligence, IEEE Service Center*, 1996, 18(8), 799-812.

* cited by examiner

METHOD, SYSTEM AND COMPUTER PROGRAM PRODUCT FOR MULTIPLE BIOMETRIC TEMPLATE SCREENING

FIELD OF INVENTION

The present invention relates generally to a data processing method, system and computer program product and more specifically to a method, system and computer program product for implementation on a fingerprint based biometric security system.

BACKGROUND

With biometric identification and authentication systems, there are two critical security parameters known in the relevant art as the false acceptance rate (FAR) and false rejection rate (FRR). The false acceptance rate (FAR) is the likelihood of incorrectly allowing an unauthorized user access while the false rejection rate (FRR) is the likelihood that an authorized user is improperly denied access. The false acceptance rate and false rejection rate have an inverse relationship such that as false acceptance rate decreases the false rejection rate increases. Furthermore, as the false acceptance rate decreases, (increasing security level) significant performance degradation begins to occur due to multiple failed attempts to match an authorized user which ties up system resources and frustrates the user. This situation is further exacerbated by enrolling multiple biometric entries from a single user but obtained from different input sources. For example, fingerprints from the same individual are more likely to provide a false acceptance due to there being some correlation between fingerprint patterns from a single person.

In a situation where a user has 10 fingerprints enrolled, and each of the ten comparisons is accomplished using a 1:100,000 false acceptance rate, the effective security level is reduced to about 1:10,000. Therefore, if the desired effective security level is 1:100,000, each finger will need to be matched at a security level of 1:1,000,000. This is a significant problem because the false rejection rates at 1:1,000,000 are much greater than the false rejection rates at 1:100,000 resulting in reduced system performance and user dissatisfaction.

As more users are added to a computer system, additional comparisons are required to be performed which further degrades both the performance and security of the system. This is of particular concern for biometric single sign-on (SSO) computer systems where identification and authentication are performed using a single user input.

In biometric SSO computer systems, the computer system must perform a one-to-many comparison between the entered biometric sample and all enrolled biometric templates to first identify a group of enrolled biometric templates having a reasonable probably of matching the biometric sample, followed by a more detailed attempt to match the biometric sample against a specific enrolled biometric template. The one-to-many comparisons releases at least some information about the enrolled biometric templates and methodology employed to perform the matching which may degrade overall system security. Optimization of system security settings must provide for reasonable user identification without increasing false rejection or false acceptance rates.

One way to address the false rejection rate is to require the user to identify the finger they intend to use for matching. However, this method detracts from the usability of the system and may introduce other security concerns by specifically identifying the biometric input source.

Thus, it would be advantageous to provide an arrangement for use with fingerprint biometric security systems which allows for an initial screening of an enrollment biometric template from a plurality of enrolled biometric templates using a comparison method that does not compromise system security or degrade system performance.

SUMMARY

This invention addresses the limitations described above and provides an arrangement for use with a fingerprint based biometric security system. The arrangement utilizes a first feature set to screen a plurality of enrollment biometric templates for a most relevant enrollment biometric template and a second feature set for performing the more computationally intensive matching of the most relevant enrollment biometric template to a biometric sample template. The screening and matching arrangements utilize different feature sets normally present in fingerprint biometric templates.

The arrangement comprises deriving a sample first feature set from a biometric sample, providing a plurality of enrollment first feature sets derived from each member of the plurality enrollment biometric templates, comparing in a one-to-many relationship, the sample first feature set to the plurality of enrollment first feature sets, and determining the most relevant enrollment biometric template by selecting an enrollment first feature set which most favorably compares to the sample first feature set. The plurality of enrollment first feature sets and the enrollment second feature set may be retrieved from a storage location or derived on demand.

Once the most relevant enrollment biometric template has been determined, the arrangement continues by deriving from the biometric sample, a second feature set, providing an enrollment second feature set derived from the most relevant enrollment biometric template and matching the second feature set to the enrollment second feature set.

The first feature set is generally comprised of spatially dependent features such as minutia points or ridge spacing frequencies. The second feature set is generally comprised of pattern dependent features such as minutia types, ridge flow angles, minutia direction, ridge count or ridge patterns.

In one embodiment of the invention, the first feature set is independent of the second feature set. In another embodiment of the invention, the first feature set overlaps with the second feature set and at least a portion of the second feature set is used to derive the sample first feature set.

In one embodiment of the invention, the arrangement may be practiced on a general purpose computer system which is provided with the ability to receive a biometric sample, retrieve the plurality of enrollment biometric templates from a storage location and includes at least one biometric processing application. The at least one biometric processing application including means for deriving the first feature set from a received biometric sample, screening the plurality of enrollment biometric templates for the most relevant enrollment biometric template in a process incorporating the first feature set and matching the most relevant enrollment biometric template to the received biometric sample in a process incorporating the second feature set. The general purpose computer system may be a local computer system or remote computer system.

In another embodiment of the invention, the computer system is in processing communications with a security token and is provided with the ability to receive a biometric sample, generate a sample biometric template which incorporates a sample first feature set and a sample second feature set and send the sample biometric template to the security token.

The security token has operatively stored therein the plurality of enrollment biometric templates and includes the ability to receive the sample biometric template, derive an enrollment first feature set from each member of the plurality of enrollment biometric templates, compare the sample first feature set to each enrollment first feature set and determine the most relevant enrollment biometric template. Once the most relevant enrollment biometric template has been determined, the security token further includes the ability to derive a most relevant second feature set from the most relevant enrollment biometric template, and match the sample second feature set to the most relevant second feature set.

In an alternate embodiment of the invention, the enrollment first feature sets are previously derived and stored as a plurality of pre-match enrollment biometric templates which have a relational association with the enrollment biometric templates from which they were derived. This arrangement reduces the computational requirements of the security token and provides a more rapid arrangement to perform matching.

The programs and associated data may be recorded on transportable digital recording media such as a CD ROM, floppy disk, data tape, or DVD for installing on a host computer system, server and/or security token.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

DETAILED DESCRIPTION

This present invention provides an arrangement for use with biometric security systems which allows the identification of an enrollment biometric template having the highest probability of matching a sample biometric template using first feature set information and matching the sample biometric template using second feature set information. The biometric applications included in this disclosure are envisioned to be programmed in a high level language such as Java™, C, C++ or Visual Basic™.

Figure 1:
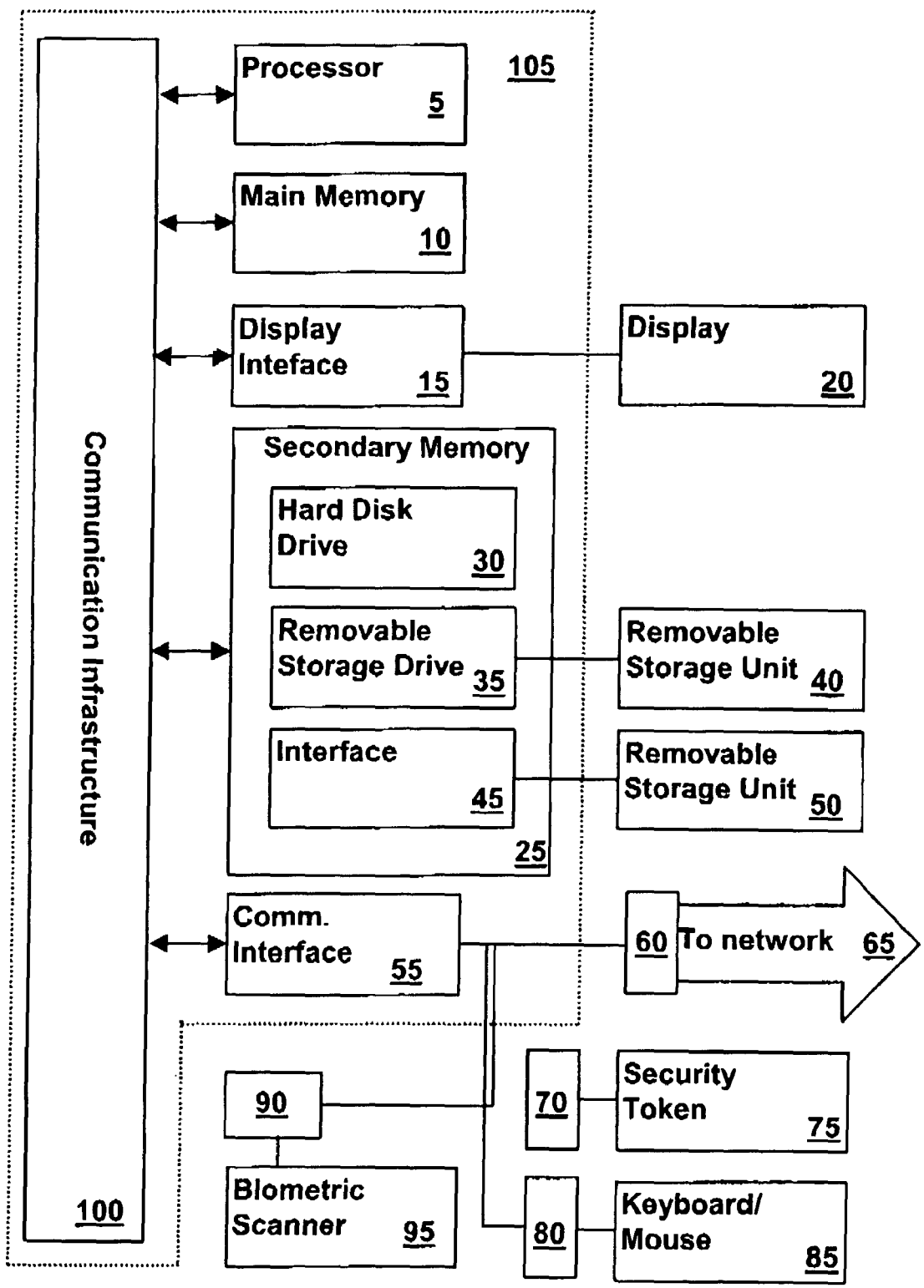
FIG. 1—is a generalized block diagram of a host computer system including associated peripheral devices.

Referring to FIG. 1, a typical host computer system 105 is shown which includes a processor 5, a main memory 10, a display 20 electrically coupled to a display interface 15, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50.

A communications interface 55 subsystem is electrically coupled to a network interface 60 and a network 65, a security token interface 70 and a security token 75, a user input interface 80 including a mouse and a keyboard 85, a biometric scanner interface 90 and a biometric scanner 95.

The processor 5, main memory 10, display interface 15 secondary memory subsystem 25 and communications interface system 55 are electrically coupled to a communication infrastructure 100. The host computer system 105 includes an operating system, cryptographic extensions, at least one biometric processing application, other applications software and data packet communications applications. The data packet applications include the ability to transmit and receive messages using at least TCP/IP and APDU protocols.

The at least one biometric processing application includes the ability to generate a biometric template, identify and extract first and second feature set information from a biometric sample received from the biometric scanner 95 and from a plurality of enrollment biometric templates retrievably stored on the hard disk drive 30, security token 75 and/or elsewhere on the network 65.

The at least one biometric processing application further includes the ability to perform comparison and matching operations using in common first and second feature set information derived from a received biometric sample and one or more enrollment biometric templates, including subsets of the first and second feature set information derived therefrom.

The first feature set information is generally comprised of spatially dependent biometric features associated with a fingerprint such as minutia points or ridge spacing frequencies. The second feature set information is generally comprised of pattern dependent biometric features associated with a fingerprint such as minutia types, ridge flow angles, minutia direction, ridge count or ridge patterns.

The first feature set information is used by the at least one biometric processing application to screen a plurality of enrollment biometric templates for a most relevant enrollment biometric template based on comparisons of first feature set information derived from a received biometric sample and the plurality of enrollment biometric templates. Derivation of the first feature sets for each of the members of the plurality of enrollment biometric templates may be accomplished in advance and retrievably stored as pre-match templates, which may be advantageous when system memory and/or processing resources are limited (e.g., security tokens.)

The most relevant enrollment biometric template is determined by generally performing a one-to-many comparison of in common first feature set information derived from the biometric sample to first feature set information derived from the plurality of enrollment biometric templates. The enrollment biometric template whose derived first feature set information most favorably compares to the first feature set information derived from the biometric sample is selected as the most relevant enrollment biometric template.

The most favorable comparison takes into consideration, the variability in biometric sampling and potential inaccuracies introduced during the conversion to logical information. Security settings are envisioned to allow an acceptable tolerance range to compensate for the variability. For the screening of a most relevant enrollment biometric template, greater tolerances may be established than may be desirable for the matching processing.

The second feature set information is used by the at least one biometric application for attempting to match the determined most relevant enrollment biometric template to the biometric sample. The matching process performs a one-to-one comparison of in common second feature set information derived from the biometric sample to second feature set information derived from the determined most relevant enrollment biometric template. A significant match exists if the second feature set of information derived from the biometric sample significantly matches the second to feature set of information derived from the most relevant enrollment biometric template. The significant match generally includes a narrower tolerance range than is provided in the screening operation. The tolerance range for matching should include security considerations such as the false rejection and false acceptance rates.

It has been determined empirically, that the features of a fingerprint can be grouped into spatially dependent and pattern dependent such that the features of the first feature set are generally independent from features of the second feature set. Disclosure of the features of one feature set provides little or no information about the other feature set of a enrollment biometric template. The table below gives an example of the biometric template feature sets.

| $1^{st}$ Feature Set (Spatially Dependent) | $2^{nd}$ Feature Set (Pattern Dependent) |
|---|---|
| Minutia location | Ridge flow edges |
| Ridge spacing | Minutia direction |
| | Minutia type |

Information included in the first feature set is said to be spatially dependent in the sense that the spatially dependent features have a unique spatial relationship to each other but have little or no relationship to the pattern dependent information contained in the second feature set. The spatially dependent information is therefore ideally suited for aligning a biometric sample template to a standardized orientation and pre-screening of potentially matching biometric enrollment templates before performing the more computationally intensive task of comparison of matching pattern dependent features contained in the second feature set.

Information included in the second feature set is said to be pattern dependent in the sense that each feature has a unique appearance or mathematical representation thereof which allows for a comparison of like features contained in the biometric sample to those contained in one or more enrollment biometric templates after the sample biometric template has been aligned to the standardized orientation using the first feature set.

In essence, the first feature set identifies the locations of where to look in the sample biometric template by providing a standardized orientation, while the second feature set provides what to look for in the locations identified by the first feature set.

The security token 75 includes an electromagnetic connection compatible with the security token interface 70, a processor, volatile and non-volatile memory electrically coupled to the processor, a runtime operating environment, a security executive application and at least one biometric processing application. The non-volatile memory has operatively stored therein one or more enrollment biometric templates belonging to a token holder. The enrollment biometric templates may be used to verify the token holder by the security executive application using transferable selection criteria based on the first and second feature set information. In one embodiment of the invention, the at least one biometric processing application includes the ability to send biometric data (derived first feature set information or pre-match templates) to the host computer system 105.

In another embodiment of the invention, the at least one biometric processing application further includes the ability to perform the matching between the second feature set information derived from the sample biometric template and second feature set information derived from one or more enrollment biometric templates.

For purposes of this disclosure, the term "security token" as defined herein refers to both hardware and software based security devices such as security tokens, smart cards, cryptography modules, integrated circuit card, portable data carriers (PDC), personal security devices (PSD), subscriber identification modules (SIM), wireless identification modules (WIM), USB token dongles, identification tokens, secure application modules (SAM), hardware security modules (HSM), virtual security tokens, secure multi-media token (SMMC) and like devices having an internal processor, memory and a runtime operating system.

Figure 1A:
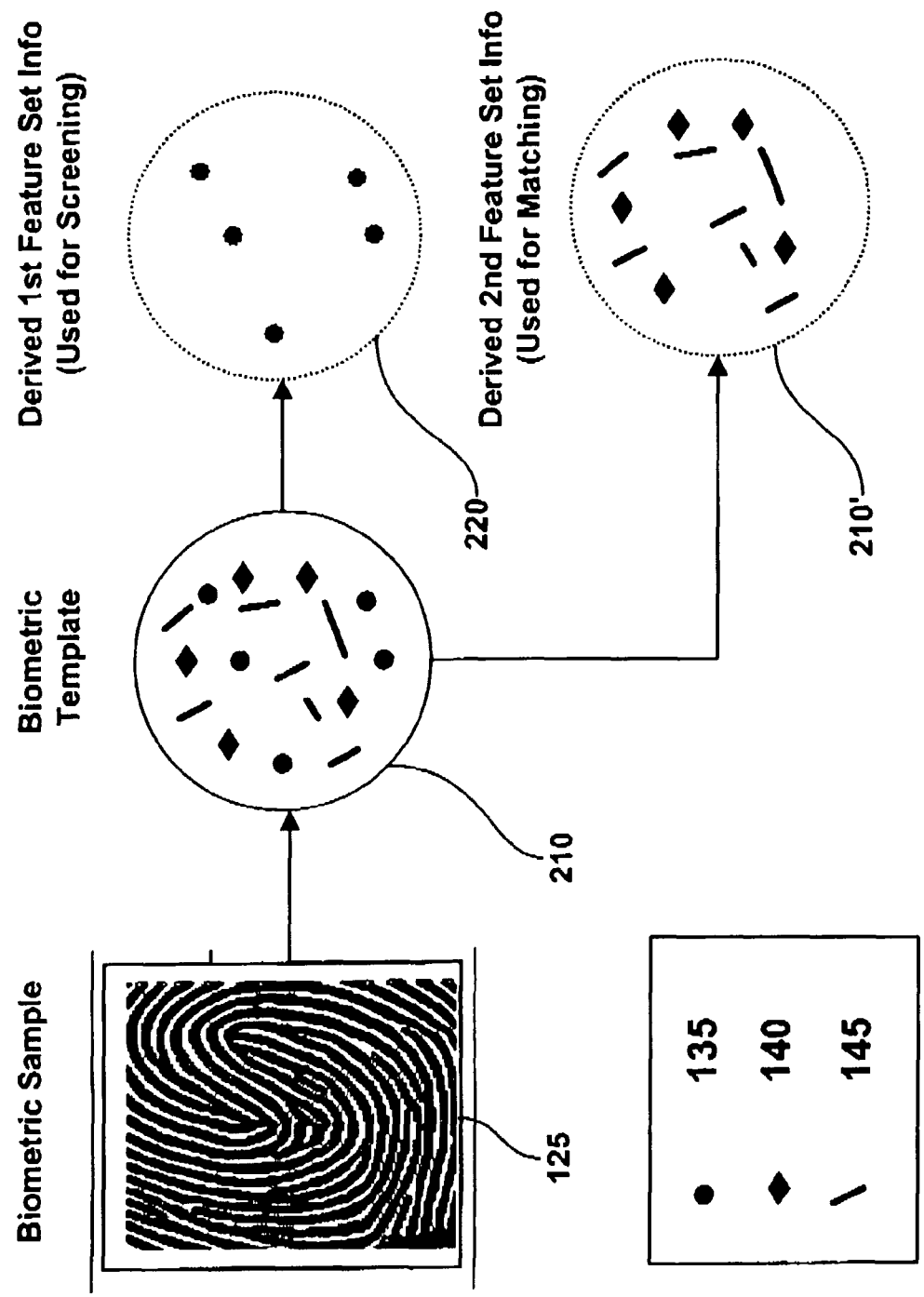
FIG. 1A is a detailed block diagram illustrating a plurality of biometric first and second feature set information derivable from a biometric sample.

Referring to FIG. 1A, a fingerprint biometric sample is shown 125 from which a biometric template is constructed 210. The biometric template includes a plurality of spatially dependent features 135 and a plurality of pattern dependent features 140, 145. The spatially dependent features are comprised of minutia points or ridge spacing frequencies and are generally referred to as first feature set information. The pattern dependent features are comprised of minutia types, ridge flow angles, minutia direction, ridge count or ridge patterns and are generally referred to as second feature set information.

The screening information 220 includes the first feature set information 135 (generally including, relative coordinates for the minutia points or ridge spacing frequencies) derived from the sample biometric template 210. When derived beforehand, the screening information is incorporated into a pre-match template. Alternately, the first feature set information 135 may be identified and derived directly from the biometric sample.

According to one embodiment of the invention, the first feature set information is intended to be independent of the second feature set information, so that disclosure of the first feature set information provides no useful information related to the biometric template from which it was derived.

Some information overlap between the two feature sets may be permitted which allows a portion of the second feature set information to be used during the screening process to increase comparison accuracy. However, inclusion of second feature set information with the first feature set information may disclose confidential portions of the enrollment biometric template during the screening process.

The matching information 235 includes the second feature set information 140, 145 derived from the sample biometric template 210. The first feature set information is normally excluded but may be included to improve matching accuracy or for template alignment. Likewise, the second feature set information 140, 145 may be identified and derived directly from the biometric sample. The second feature set information is intended to be independent of the first feature set information, so that disclosure of the second feature set information also provides no useful information related to the biometric template from which it was derived.

In another embodiment of the invention, the derived first 210 and second 210' feature sets may be separately incorporated into retrievable screening and matching templates.

Figure 2:
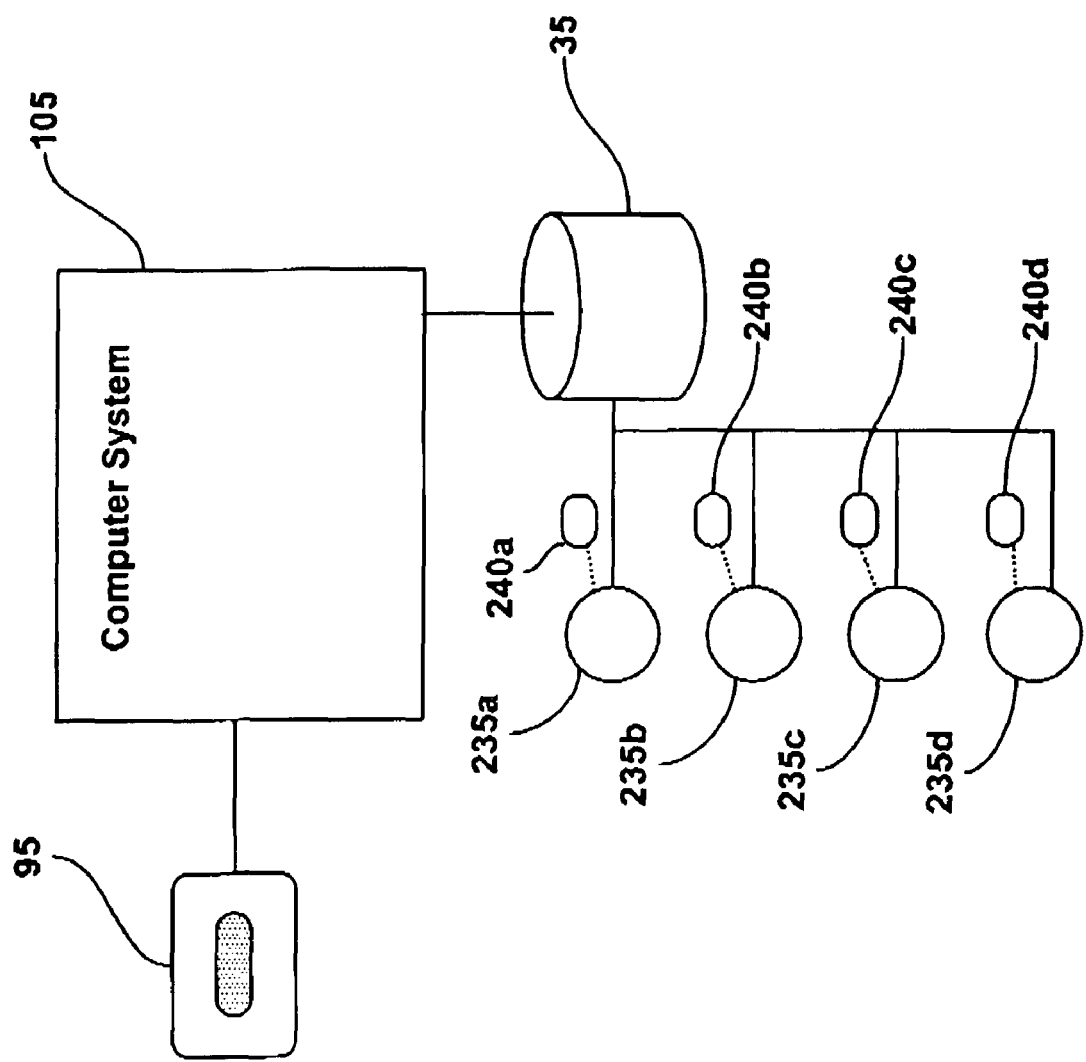
FIG. 2—is a detailed block diagram illustrating a basic embodiment of the invention.

Referring to FIG. 2, a basic embodiment of the invention is depicted where a biometric scanner 95 is electrically coupled to a computer system 105. The computer system 105 includes a plurality of enrollment biometric templates 235a, 235b, 235c, 235d retrievably stored on a local bard drive 35. Each of the enrollment biometric templates 235a, 235b, 235c, 235d includes both first and second feature set information derived from the biometric samples used for enrollment.

In an alternate embodiment of the invention, each of the enrollment biometric templates 235a, 235b, 235c, 235d is retrievably associated with a pre-match enrollment template 240a, 240b, 240c, 240d.

The pre-match enrollment templates 240a, 240b, 240c, 240d are comprised of first feature set information derived from each member of the plurality of enrollment templates. The physical size of the pre-match templates is such that each template may be incorporated into a minimum number of TCP/IP or APDU data packets which may be advantageous in memory or processing capacity limited situations.

The first feature set information included in the pre-match templates provides sufficient information for screening of a most relevant enrollment biometric template from the plurality of enrollment biometric templates 235a, 235b, 235c, 235d, but provides no useful information related to the enrollment biometric template from which it was derived.

Figure 2A:
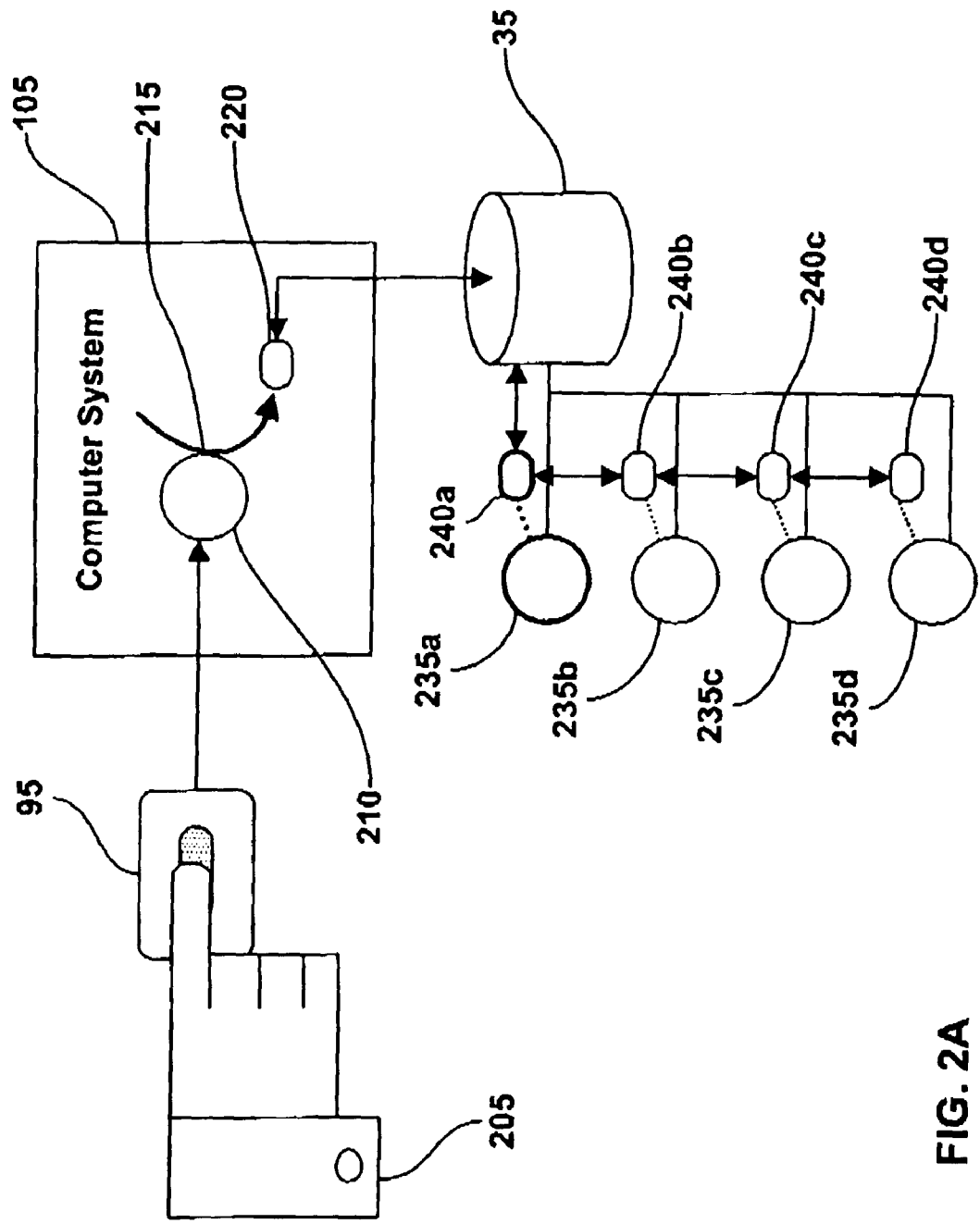
FIG. 2A—is a detailed block diagram illustrating derivation and comparison of a sample first feature set information to a plurality of enrollment first feature set information in order to determine a most relevant enrollment biometric template.

In FIG. 2A, a user 205 enters his or her biometric sample into the biometric scanner 95. The biometric sample is sent to the computer system 105 where a sample biometric template is generated 210. Once the sample biometric template 210 has been generated, the first feature set information is derived 215 from the biometric sample template 210. The first feature set information is then derived from each of the enrollment biometric templates 235a, 235b, 235c, 235d. The sample first feature set information is then compared to each of the first feature set information derived from the plurality of enrollment biometric templates 235a, 235b, 235c, 235d. The most relevant enrollment biometric template 235a is determined by generally performing a one-to-many comparison of in common first feature set information derived from the biometric sample 210 to first feature set information derived from the plurality of enrollment biometric templates 235a, 235b, 235c, 235d.

In the alternate embodiment of the invention, the sample derived first feature set information may be incorporated into a sample pre-match template 220 and most favorably compared to each of the enrollment pre-match templates 240a, 240b, 240c, 240d. The enrollment biometric template 235a, 235b, 235c, 235d whose derived first feature set information most favorably compares to the first feature set information derived from the biometric sample is selected as the most relevant enrollment biometric template 235a. In this example, the first feature set information derived from enrollment biometric template 235a provides the most favorable match to the first feature set information derived from the sample biometric template 220.

In the alternate embodiment, the enrollment biometric template 235a, 235b, 235c, 235d whose derived enrollment pre-match template most favorably compares to the sample pre-match template 220 is selected as the most relevant enrollment biometric template. In this example, the pre-match template 240a associated with the enrollment biometric template 235a provides the most favorable match to the sample pre-match template 220.

Figure 2B:
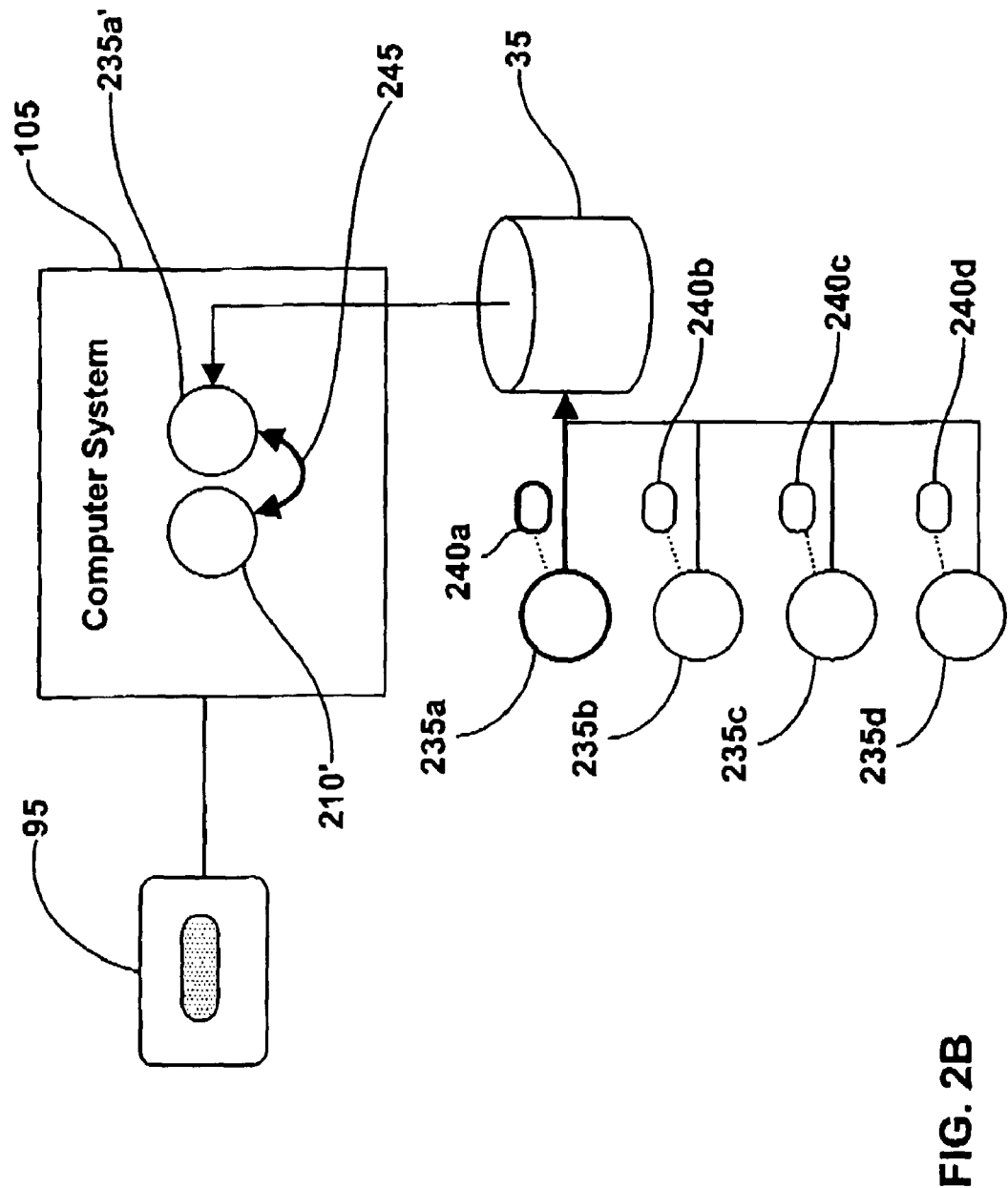
FIG. 2B—is a detailed block diagram illustrating derivation and matching of sample second feature set information to second feature set information derived from the determined most relevant enrollment biometric template.

Referring to FIG. 2B, once the most relevant enrollment biometric template 235a has been identified, the second feature set information is derived 235a' and matched 245 with the second feature set information sample derived from the sample biometric template 210'. The matching process performs a one-to-one comparison of in common second feature set information derived from the biometric sample to second feature set information derived from the determined most relevant enrollment biometric template. A significant match exists if the second feature set of information derived from the biometric sample significantly matches the second feature set of information derived from the most relevant enrollment biometric template. The significant match generally includes a narrower tolerance range than is provided in the screening operation.

Figure 2C:
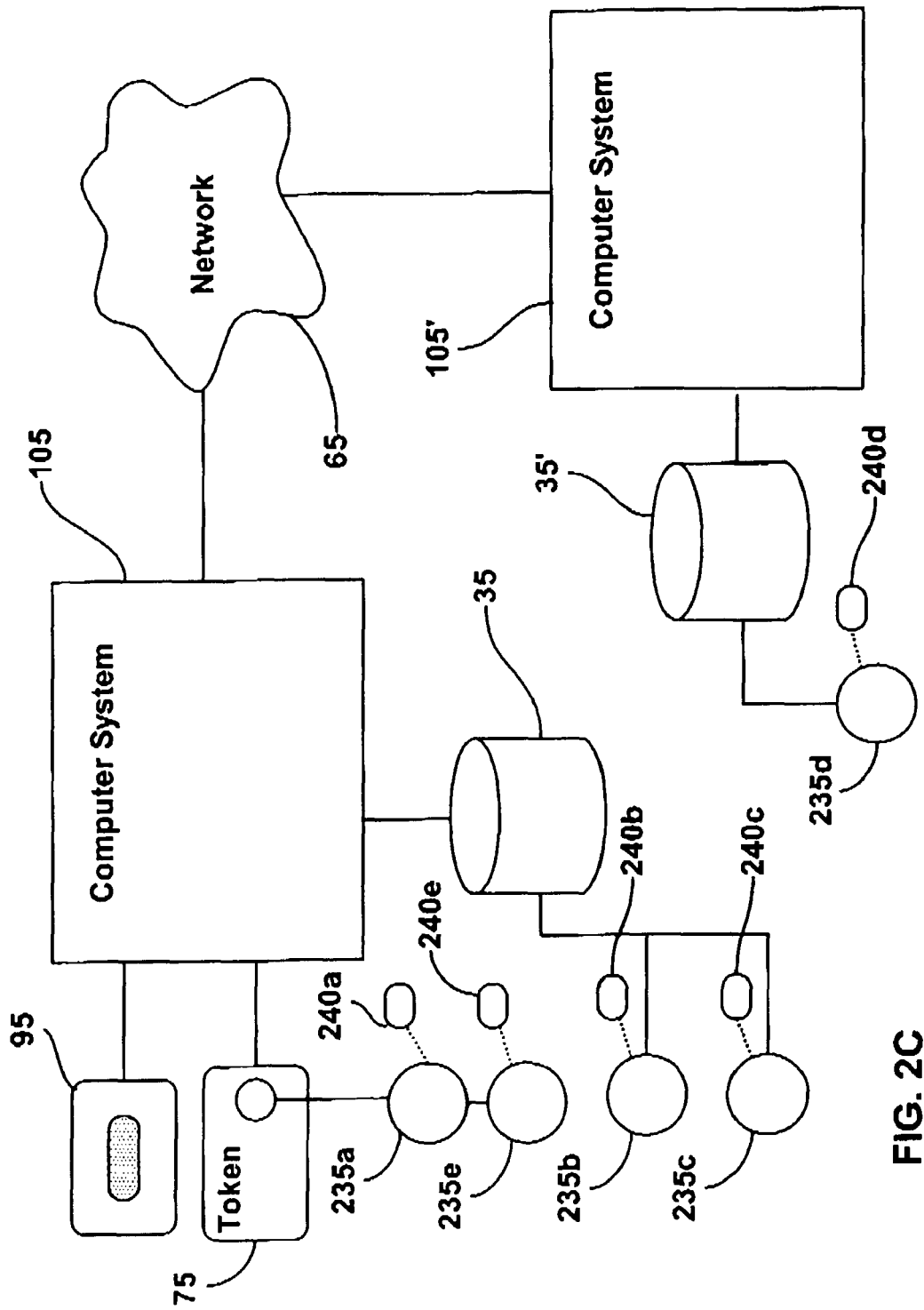
FIG. 2C—is a detailed block diagram of illustrating an alternate embodiment of the invention where a plurality of enrollment biometric templates are retrievably stored on a local computer system, a remote computer system and/or a security token.

Referring to FIG. 2C, an alternate embodiment of the invention is shown where the plurality of enrollment biometric templates 235a, 235b, 235c, 235d, 235e and pre-match enrollment templates 240a, 240b, 240c, 240d, 240e may be retrieved from a local storage location 35, a remote storage location 35' addressable via the networked 65 computer system 105', a security token 75 in processing communications with the local computer system 105 or a combination thereof.

Figure 3:
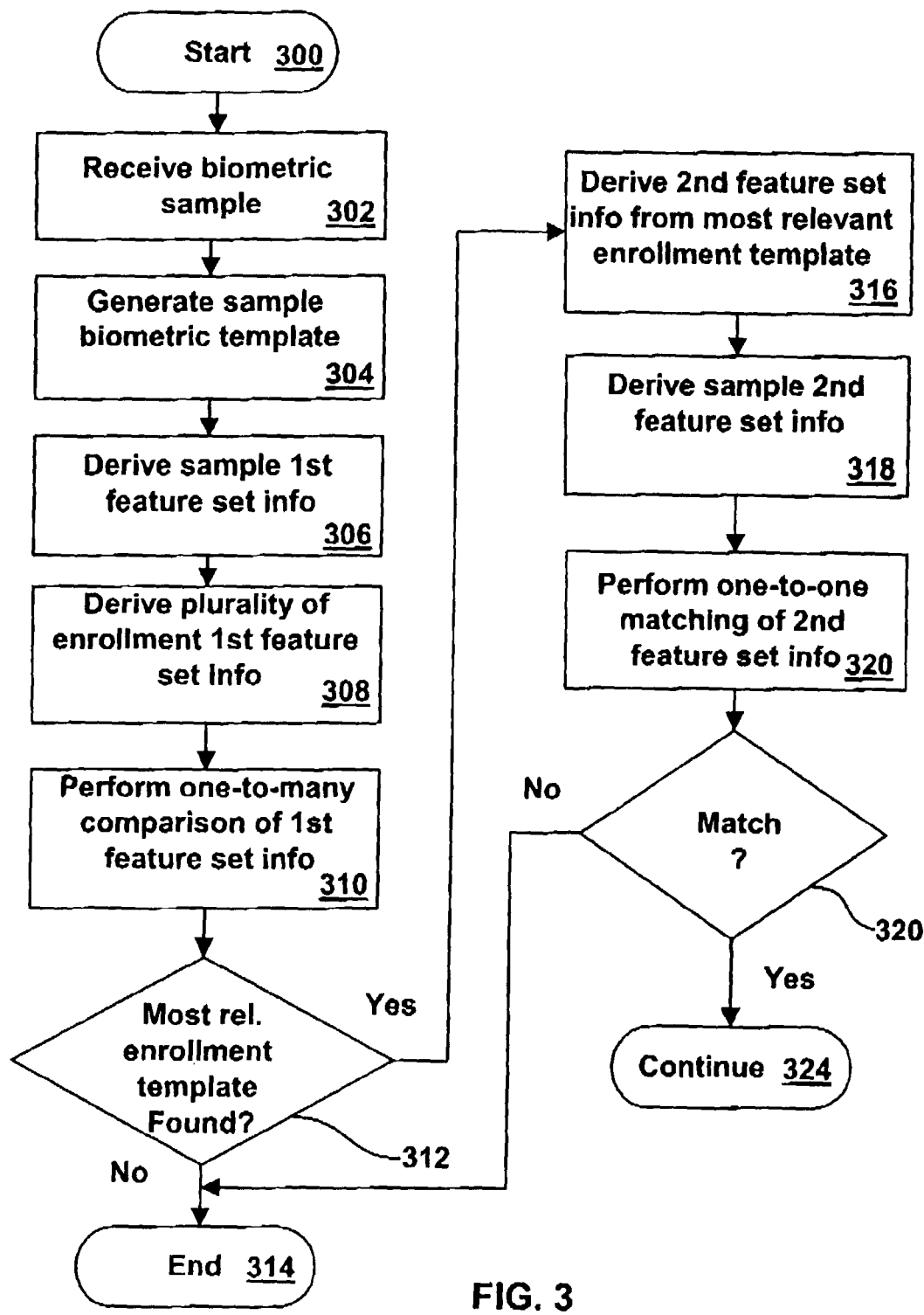
FIG. 3 is a flow diagram illustrating the steps for implementing one embodiment of the invention.

Referring to FIG. 3, a flow chart of the major steps for implementing one embodiment of the invention is depicted. The process is initiated 300 by receipt of a biometric sample 302 from a biometric scanner electrically coupled to a host computer system. At least one biometric processing application installed on the host computer system processes the incoming biometric sample and generates a sample biometric template 304. First feature set information is then derived from the generated sample biometric template 306. The first feature set information includes spatially oriented biometric features such as minutia points or ridge spacing frequencies which are used for comparison to minutia points or ridge spacing frequencies derived from a plurality of enrollment biometric templates 308. A most favorable one-to-many comparison is then performed between the derived sample and plurality of enrollment biometric template first feature set information 310.

If the most favorable one-to-many comparison of derived first feature set information is unsuccessful within acceptable tolerance ranges 312, processing ends 314 (or the user must re-enter his or her biometric sample and restart the process 300.) If the most favorable one-to-many comparison is successful within the acceptable tolerance ranges 312, the identified most relevant enrollment biometric template undergoes further processing, whereby second feature set information is derived from the identified most relevant biometric template 316.

The second feature set information includes pattern oriented biometric features such as minutia types, ridge flow angles, minutia direction, ridge count or ridge patterns which are used to perform a match with in common second feature set information derived from the sample biometric template 318. Matching of the derived sample and most relevant enrollment biometric template second feature set information is generally performed using a one-to-one match having narrower tolerances than is typically afforded with the screening portion of the process 320. If no significant match is found within acceptable tolerance ranges 320, processing ends 314. If a significant match is found within acceptable tolerance ranges 320, processing is permitted to continue 324.

Figure 3A:
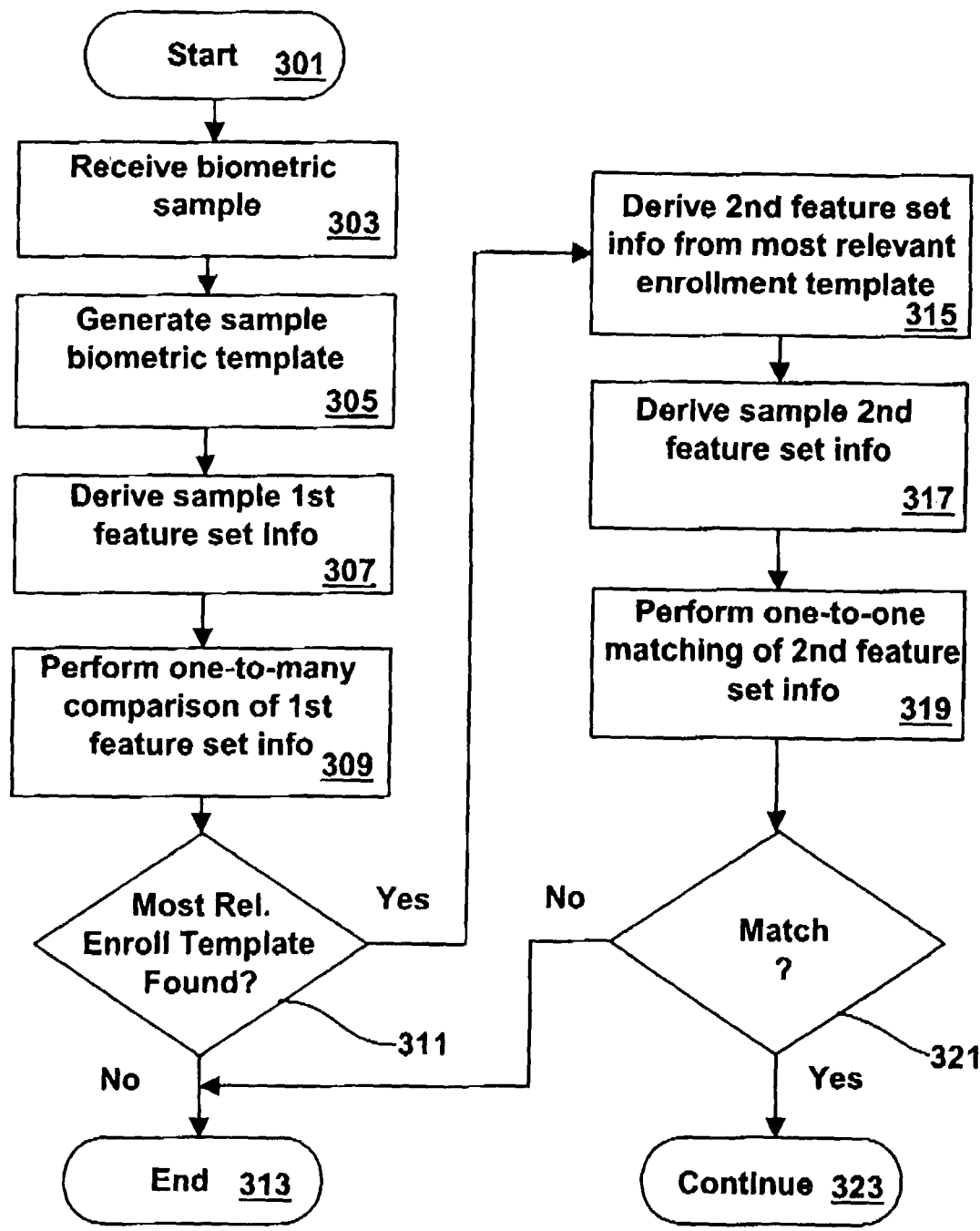
FIG. 3A—is a flow diagram illustrating the steps for implementing an alternate embodiment of the invention.

Referring to FIG. 3A, a flow chart depicts the major steps for implementing another embodiment of the invention. In this alternate embodiment of the invention, the process is initiated 301 by receipt of a biometric sample 303 from a biometric scanner electrically coupled to a host computer system. The at least one biometric processing application installed on the host computer system processes the incoming biometric sample and generates a sample biometric template 305.

As previously described, the first feature set information is derived from the generated sample biometric template 307. However, in this alternate embodiment of the invention, first feature set information is derived from the plurality of enrollment biometric templates beforehand and retrievably stored in a plurality of pre-match templates. Each of the pre-match templates includes a retrievable relationship with the enrollment biometric template from which it was derived. The most favorable one-to-many comparison is then performed between the derived sample and plurality of pre-match templates 309.

If the most favorable one-to-many comparison of the derived sample first feature set information and pre-match templates is unsuccessful within acceptable tolerance ranges 311, processing ends 313 (or the user must re-enter his or her biometric sample and restart the process 301.) If the most favorable one-to-many comparison is successful within the acceptable tolerance ranges 311, the most relevant enrollment biometric template associated with the most favorably comparing pre-match template undergoes further processing whereby the second feature set information is derived from the identified most relevant biometric template 315, and likewise, from the sample biometric template 317.

As before, matching of the derived sample and most relevant enrollment biometric template second feature set information is generally performed using a one-to-one match having narrower tolerances than is typically afforded with the screening portion of the process 319. If no significant match is found within acceptable tolerance ranges 321, processing ends 323. If a significant match is found within acceptable tolerance ranges 321, processing is permitted to continue 323.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular computer system, programming language or operating environment. Other variations and embodiments are possible in light of above teachings, and it is not intended that this Detailed Description limit the scope of invention, but rather by the Claims following herein.

What is claimed:

1. A fingerprint biometric security method, comprising:
   deriving, with a computer system, a sample first feature set from a biometric sample, wherein the sample first feature set comprises spatially dependent features including at least one of minutia points and ridge spacing;
   orienting the sample first feature set to a standardized orientation based on the spatially dependent features;
   comparing the sample first feature set to a plurality of enrollment first feature sets at the standardized orientation, wherein the enrollment first feature sets are derived from corresponding enrollment biometric templates;
   determining a single most relevant enrollment biometric template by selecting the enrollment first feature set which most favorably compares to the sample first feature set;
   deriving a sample second feature set from the biometric sample, wherein the sample second feature set comprises pattern dependent features including at least one of minutia types, ridge flow angles, minutia direction, and ridge patterns; and
   comparing the sample second feature set to an enrollment second feature set at the standardized orientation, wherein the enrollment second feature set is derived from the most relevant enrollment biometric template, and wherein the sample first feature set is independent of the sample second feature set.

2. The method according to claim 1, further comprising retrieving the plurality of enrollment first feature sets from a storage location.

3. The method according to claim 1, further comprising deriving the plurality of enrollment first feature sets on demand.

4. The method according to claim 1, further comprising retrieving the enrollment second feature set from a storage location.

5. The method according to claim 1, further comprising deriving the enrollment second feature set on demand.

6. The method according to claim 1 wherein comparing the sample first features set and the determining the most relevant steps enrollment biometric template are performed by a security token in processing communications with a computer system.

7. The method according to claim 1 wherein the computer system is either a local computer system or a remote computer system.

8. The method according to claim 1 wherein the sample first feature set and the sample second feature set derived from the biometric sample are incorporated into a sample biometric template.

9. An apparatus including a non-transitory computer-readable storage medium having instructions stored thereon that, when executed by computing device having a processor and memory, causes the processor of the computing device to perform operations comprising:
   deriving a sample first feature set from a biometric sample, wherein the sample first feature set comprises spatially dependent features including at least one of minutia points and ridge spacing;
   deriving a plurality of enrollment first feature sets from each member of a plurality of enrollment biometric templates;
   orienting the sample first feature set to a standardized orientation based on the spatially dependent features;
   comparing the sample first feature set to the plurality of enrollment first feature sets at the standardized orientation;
   determining a single most relevant enrollment biometric template based on the comparison of the sample first feature set;
   deriving a sample second feature set from the biometric sample, wherein the sample second feature set comprises pattern dependent features including at least one of minutia types, ridge flow angles, minutia direction, and ridge patterns;
   deriving an enrollment second feature set from the most relevant enrollment biometric template; and comparing the enrollment second feature set to the sample second feature set at the standardized orientation, wherein the sample first feature set is independent of the sample second feature set.

10. The apparatus according to claim 9 wherein the plurality of enrollment first feature sets are derived in advance and incorporated into enrollment pre-match templates.

11. A non-transitory computer-readable storage medium having stored thereon, computer executable instructions that, if executed by an apparatus, cause the apparatus to perform operations comprising:
   deriving a first sample-based feature set from a biometric sample, wherein the first sample-based feature set comprises spatially dependent features including at least one of minutia points and ridge spacing;
   orienting the first sample-based feature set to a standardized orientation based on the spatially dependent features;
   comparing the first sample-based feature set to a plurality of enrollment-based feature sets at the standardized orientation, wherein the enrollment-based feature sets are derived from plurality of enrollment biometric templates;
   determining a single most relevant enrollment biometric template by selection of the enrollment-based feature set which most favorably compares to the first sample-based feature set;
   deriving a second sample-based feature set from the biometric sample, wherein the second sample-based feature set comprises pattern dependent features including at least one of minutia types, ridge flow angles, minutia direction, and ridge patterns; and
   comparing the second feature set to an enrollment second feature set at the standardized orientation, wherein the enrollment second feature set is derived from the most relevant enrollment biometric template, and wherein the first sample-based feature set is independent of the second sample-based feature set.

12. A fingerprint biometric security system, comprising:
   a first component configured to receive a biometric sample;
   a second component configured to generate a sample biometric template which incorporates a sample first feature set and a sample second feature set, wherein the sample first feature set is independent of the sample second feature set, and wherein the sample first feature set comprises spatially dependent features including at least one of minutia points and ridge spacing, and the sample second feature set comprises pattern dependent features including at least one of minutia types, ridge flow angles, minutia direction, and ridge patterns, and wherein the second component is further configured to orient the sample biometric template to a standardized orientation based on the spatially dependent features;
   a third component configured to send the sample biometric template to a security token, wherein the security token includes the plurality of enrollment biometric templates operatively stored therein, and wherein the third component is further configured to—
      receive the sample biometric template;
      derive an enrollment first feature set from each member of the plurality of enrollment biometric templates;
      compare the sample first feature set to each derived enrollment first feature set;
      determine a single most relevant enrollment biometric template;
      derive a most relevant second feature set from the most relevant enrollment biometric template; and
      compare the sample second feature set to the most relevant second feature set at the standardized orientation
   wherein at least one of the first, second, and third components comprises computer executable instructions stored in a non-transitory computer-readable storage medium for execution by a computing device.

13. The system according to claim 12 wherein the security token includes a plurality of pre-match enrollment templates operatively stored therein, wherein the pre-match enrollment templates are derived from and relationally associated with the plurality of enrollment biometric templates, and wherein the security token is configured to compare the sample first feature set to the plurality of pre-match enrollment templates.

14. The system according to claim 12 wherein the security token is further configured to:
   derive a sample second feature set from the sample biometric template;
   derive a most relevant second feature set from the most relevant enrollment biometric template; and
   match the sample second feature set to the most relevant second feature set.

* * * * *

UNITED STATES PATENT AND TRADEMARK OFFICE
CERTIFICATE OF CORRECTION

PATENT NO. : 8,171,304 B2  
APPLICATION NO. : 10/438067  
DATED : May 1, 2012  
INVENTOR(S) : Hillhouse Page 1 of 1

It is certified that error appears in the above-identified patent and that said Letters Patent is hereby corrected as shown below:

On the Title Page, in Item (56), under "FOREIGN PATENT DOCUMENTS", in Column 2, Line 2, delete "WO   WO 03/010705 A1   2/2003".

On Title Page 2, in Item (56), under "OTHER PUBLICATIONS", in Column 2, Line 9, delete "Analaysis" and insert -- Analysis --, therefor.

In Column 5, Line 18, delete "to feature" and insert -- feature --, therefor.

In Column 7, Line 13, delete "bard" and insert -- hard --, therefor.

In Column 12, Line 13, in Claim 12, delete "to—" and insert -- to: --, therefor.

In Column 12, Lines 24-25, in Claim 12, delete "orientation" and insert -- orientation; --, therefor.

Signed and Sealed this  
Eighteenth Day of September, 2012

David J. Kappos  
*Director of the United States Patent and Trademark Office*